United States Patent
Yang

(10) Patent No.: US 9,121,557 B2
(45) Date of Patent: Sep. 1, 2015

(54) LAMP HAVING MULTI-FUNCTIONAL SUPPORT

(71) Applicant: Jianqiao Yang, Toronto (CA)

(72) Inventor: Jianqiao Yang, Toronto (CA)

( * ) Notice: Subject to any disclaimer, the term of this patent is extended or adjusted under 35 U.S.C. 154(b) by 0 days.

(21) Appl. No.: 14/195,251

(22) Filed: Mar. 3, 2014

(65) Prior Publication Data

US 2014/0268636 A1    Sep. 18, 2014

Related U.S. Application Data

(63) Continuation-in-part of application No. 13/837,744, filed on Mar. 15, 2013.

(30) Foreign Application Priority Data

May 16, 2013  (CN) .................. 2013 2 0267515 U
Dec. 9, 2013   (CN) .................. 2013 2 0801772 U

(51) Int. Cl.
| | |
|---|---|
| F21K 2/00 | (2006.01) |
| F21S 6/00 | (2006.01) |
| F21V 21/06 | (2006.01) |
| G09F 23/04 | (2006.01) |

(52) U.S. Cl.
CPC . *F21S 6/002* (2013.01); *F21K 2/00* (2013.01); *F21V 21/06* (2013.01); *G09F 23/04* (2013.01); *Y02W 30/829* (2015.05); *Y10T 29/49002* (2015.01)

(58) Field of Classification Search
CPC ......................................................... F21K 2/00
See application file for complete search history.

(56) References Cited

U.S. PATENT DOCUMENTS

| | | | |
|---|---|---|---|
| 5,654,552 A | 8/1997 | Toombs | |
| 5,806,973 A | 9/1998 | Porter | |
| 5,833,349 A * | 11/1998 | Apple | ............................. 362/84 |
| 6,056,414 A | 5/2000 | Krieger | |
| 6,287,492 B1 | 9/2001 | Goldfarb | |
| 6,306,470 B1 | 10/2001 | Goldfarb et al. | |
| 7,834,752 B2 | 11/2010 | Kuvantrarai | |
| 8,282,858 B2 | 10/2012 | Agrawal et al. | |
| 2004/0246700 A1 | 12/2004 | Palmer et al. | |
| 2005/0003120 A1 | 1/2005 | Kao | |
| 2005/0029689 A1 | 2/2005 | Dufort | |
| 2005/0201078 A1 | 9/2005 | Hannington | |
| 2006/0227537 A1 | 10/2006 | Vanderschuit | |
| 2007/0263377 A1 | 11/2007 | Butler | |

(Continued)

FOREIGN PATENT DOCUMENTS

| | | |
|---|---|---|
| GB | 2412959 A | 10/2005 |
| JP | 2007203575 A | 8/2007 |

OTHER PUBLICATIONS

Screen shots from the Coke Lamp by Cactopus on deviantART website (2 pages), http://cactopus.deviantart.com/art/The-Coke-Lamp-173796334 (extracted Mar. 3, 2014).

(Continued)

*Primary Examiner* — Mary Ellen Bowman

(57) ABSTRACT

There is provided a lamp having a support and a socket on the support for receiving a light bulb and selectively providing power thereto. The support has a body portion shaped to resemble a selected article. The body portion has a cavity or recess shaped to form an indicia indicating an entity associated with the selected article. The cavity or recess is positioned to receive light from the light bulb, and is filled with a photoluminescent material.

20 Claims, 8 Drawing Sheets

(56) References Cited

U.S. PATENT DOCUMENTS

2008/0121818 A1    5/2008  Agrawal et al.
2009/0045718 A1*   2/2009  Auer et al. .................... 313/483
2011/0110105 A1    5/2011  Kenney

OTHER PUBLICATIONS

Screen shot from I Lite 4 U website (1 page), http://www.ilite4u.com/New_Folder/lamps1.jpg (extracted Mar. 3, 2014).
Office Action issued Sep. 3, 2014 for U.S. Appl. No. 13/837,744.
Office Action issued Jan. 2, 2015 for U.S. Appl. No. 13/837,744.
Vectric Forum; View Topic, Lithophanes and Corian; http://www.vectric.com/forum/viewtopic.php?f=7&t=10818; retrieved from the Internet Feb. 27, 2013.
The Photo Gift Maker; Photo Lamp Shades—Lithophanes—Cube Light; http://www.thephotogiftmaker.com/cat/lamp-shades-cubes-902; retrieved from the Internet Feb. 27, 2013.
GD International; China Trade Online; http://www.gd-wholesale.com/userimg/23/1270i1/decent-marble-table-lamp-227.jpg; retrieved from the Internet Feb. 28, 2013.

* cited by examiner

LAMP HAVING MULTI-FUNCTIONAL SUPPORT

CROSS-REFERENCE TO RELATED APPLICATIONS

This application is a continuation-in part of and claims the benefit of U.S. patent application Ser. No. 13/837,744, filed Mar. 15, 2013, the contents of which are incorporated herein by reference in their entirety.

This application also claims the benefit of Chinese Utility Model Patent Application No. 201320267515.9, filed May 16, 2013, and the benefit of Chinese Utility Model Patent Application No. 201320801772.6, filed Dec. 9, 2013, the contents of both of which are incorporated herein by reference in their entirety.

TECHNICAL FIELD

This relates to lamps, and more particularly, to lamps having multi-functional supports.

BACKGROUND

A table lamp typically has a support body for supporting and mounting various components of the lamp. Lamp support bodies may also be shaped, or formed of different articles, for decorative or artistic purposes. For example, lamp support bodies have been shaped like basketballs, or formed using a bottle or baseballs.

SUMMARY

In an aspect, there is provided a lamp including a support and a socket on the support for receiving a light bulb and selectively providing power thereto. The support has a body portion shaped to resemble a selected article. The body portion has a cavity or recess shaped to form an indicia indicating an entity associated with the selected article. The cavity or recess is positioned to receive light from the light bulb, and is filled with a photoluminescent material.

In another aspect, there is provided a method that includes identifying an article for conveying a message, for promoting the article, or for promoting an entity associated with the article. The method also includes obtaining or forming lamps, which may each be a lamp as disclosed herein. The body portion of each lamp is shaped to resemble the identified article and the indicia on the body portion indicates the entity associated with the article. The method may also include distributing the lamps for viewing by members of a target group to convey the message to the members, or to promote the selected article to the members, or to promote the entity associated with the article to the members.

In a further aspect, there is provided a method comprising identifying an article and an associated entity to be promoted, and distributing lamps to members of a target group. The body portion of each lamp may resemble the identified article, and the indicia on the body portion may indicate the identified associated entity. Each lamp may be a lamp as disclosed herein.

In yet further aspects, a lamp as disclosed herein is used for conveying a message, for promoting a selected article, for promoting an entity associated with the selected article, or for promoting a product marketed by the entity, wherein the selected article represents the product.

In yet another aspect, there is provided a lamp having a support and a socket on the support for receiving a light bulb and selectively providing power thereto. The support includes a body portion having a cavity or recess shaped to form an indicia. The cavity or recess is positioned to receive light from the light bulb and is filled with a photoluminescent material.

In another aspect, there is provided a method of forming a lamp support. The method includes providing a lamp support comprising a body portion shaped to resemble a selected article, the body portion having a cavity or recess shaped to form an indicia indicating an entity associated with the selected article, and filling the cavity or recess with a photoluminescent material. Filling the cavity or recess may include binding the photoluminescent material to the body portion in the cavity or recess, or sealing the photoluminescent material in the cavity or recess.

BRIEF DESCRIPTION OF THE DRAWINGS

In the figures which illustrate example embodiments.

DETAILED DESCRIPTION

It has been recognized that lamps, particularly lamp support bodies, can be used to perform multiple functions. For example, a lamp disclosed herein may also be conveniently used to promote a product, an entity, or association between the product and the entity. Thus, a lamp support body disclosed herein may be conveniently used to convey a message or information, in addition to supporting other lamp components and being decorative. It has also been recognized that an embodiment disclosed herein may better perform such an additional function.

Figure 1A:
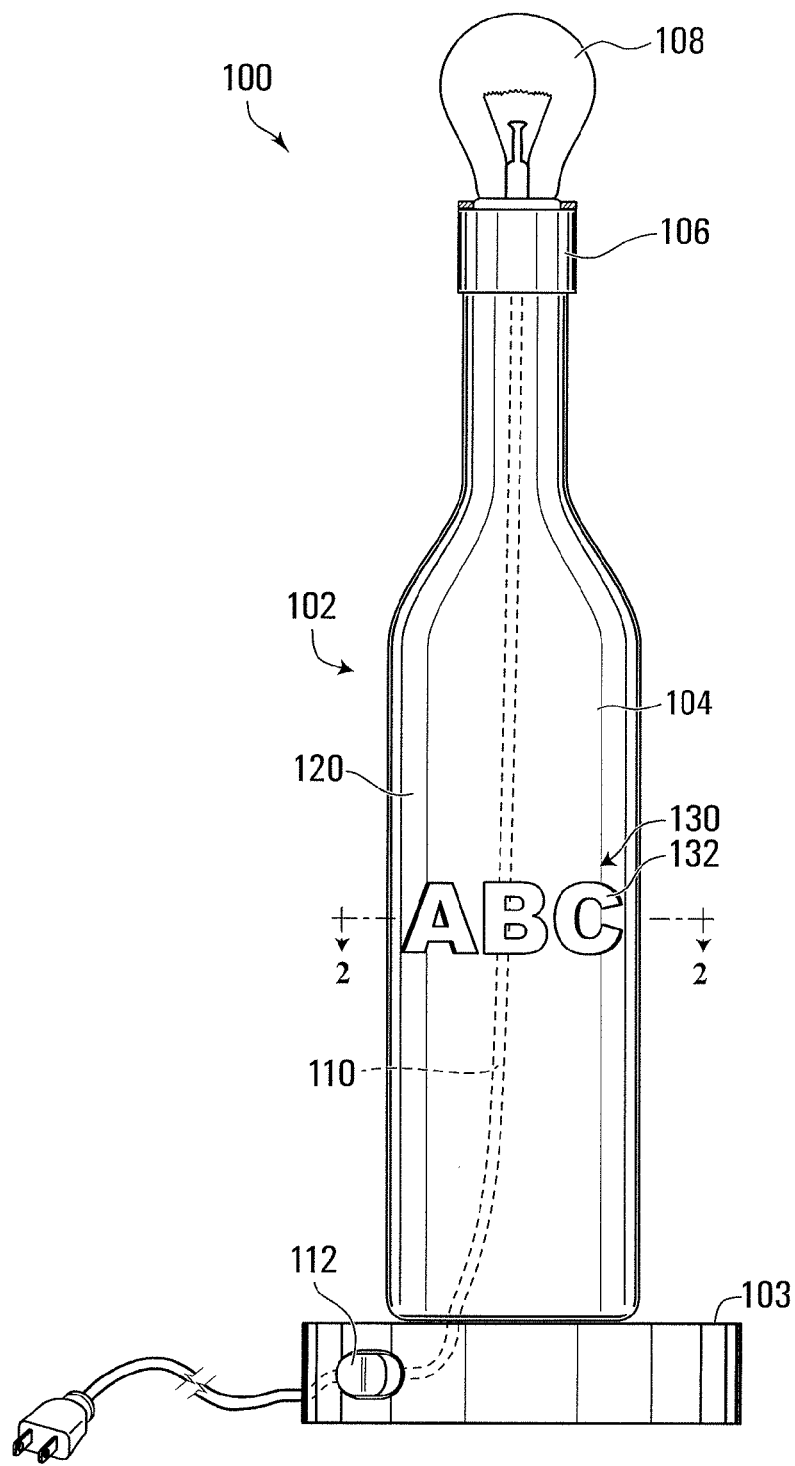
FIG. 1A is a side elevation view of a lamp, exemplary of an embodiment.
Figure 1B:
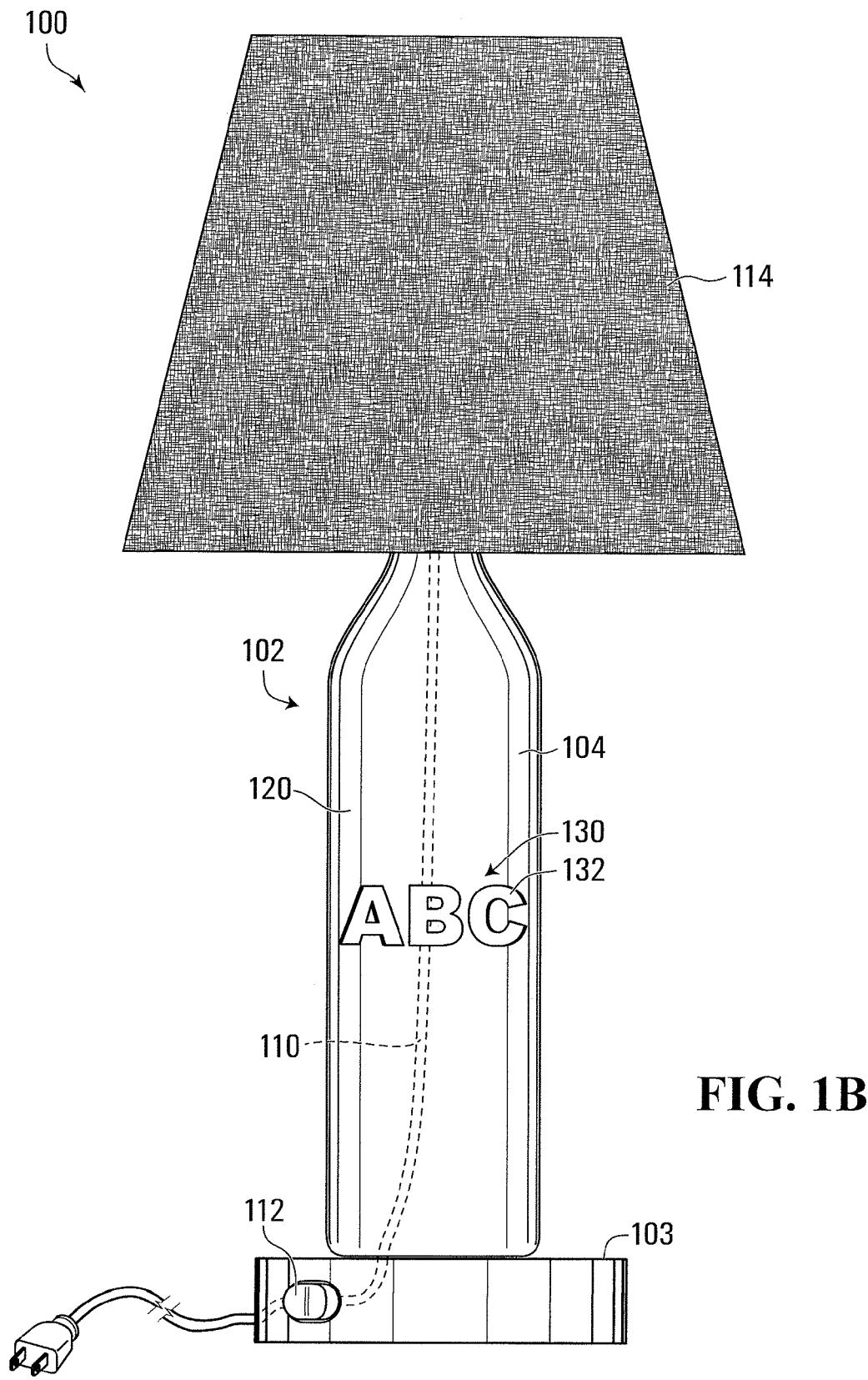
FIG. 1B is side elevation view of the lamp of FIG. 1A, with a lampshade.

FIGS. 1A and 1B depict a lamp 100, exemplary of an embodiment. As depicted in FIG. 1A, lamp 100 includes a support 102 comprising a base 103 and a body 104. As depicted in FIG. 1B, lamp 100 may also include a removable lampshade 114. A socket 106 is provided on the top end of support 102 for receiving a light bulb, e.g, light bulb 108, and selectively providing power to that light bulb. Body 104 is shaped to resemble a selected article, e.g., a bottle as depicted, and includes recesses 132 shaped to provide indicia 130 indicating an entity associated with the selected article. Recesses 132 are positioned to receive light from a light bulb received in socket 106, and are filled with a photoluminescent material, causing indicia 130 to be photoluminescent. When the light bulb is on, the photoluminescent material absorbs light from the light bulb and emits light in response. The photoluminescent material may be an afterglow material so it glows for an extended period of time after the light bulb has been turned off. The light emitted by the photoluminescent material allows indicia 130 to be seen even in the dark.

The shape of body 104 and photoluminescent indicia 130 provided thereon cooperate to convey a message or information to individuals who are looking at lamp 100, including when lamp 100 is turned off and is in a dark environment. Thus, lamp 100 may be conveniently used as a medium for disseminating a message or information. For example, lamp 100 may be used to promote the selected article that body 104 is shaped to resemble, or its associated entity, as indicated by photoluminescent indicia 130.

Base 103 includes a substantially flat bottom surface allowing lamp 100 to be rested on a substantially flat surface, and is sized and weighted to stabilize lamp 100. As depicted, base 103 is substantially cylindrical in shape. However, in other embodiments, base 103 may be shaped like a prism, a pyramid, a cone, a half-sphere, or the like. In the depicted embodiment, base 103 is made of metal. However, base 103 may also be made of another type of material such as rock, ceramic, wood, plastic, or combinations thereof. Other types of suitable materials will be apparent to those of ordinary skill in the art. For ease of manufacture, base 103 may be formed from the same material(s) as body 104, as detailed below. Base 103 includes a switch 112 for controlling the supply of electric power to light bulb 108, further detailed below.

Body 104 is mounted on base 103, and elevates socket 106, light bulb 108, and lampshade 114 from base 103. Body 104 may be securely fastened to base 103 using conventional fasteners such as adhesives, screws, bolts, ties, or the like. Body 104 may be made of materials that are strong enough to support socket 106, light bulb 108, and lampshade 114, while also being sufficiently workable to allow body 104 to be readily shaped. For example, in the depicted embodiment, body 104 may be made of rock, specifically, marble. Body 104 may also be made of another type of rock such as granite, limestone, a gemstone (e.g., jade, malachite, quartz), or the like. Body 104 may also be made of other materials such as ceramic, crystal, glass, cast stone, plastic, synthetic resin, wood, metal (e.g., copper, brass, or steel), or the like. As will be appreciated, when body 104 is made of a transparent or translucent material (e.g., crystal, glass, or translucent ceramic), body 104 may be transparent or translucent.

As noted, body 104 is shaped to resemble a selected article. Body 104 may be shaped to resemble any selected article having a recognizable shape. In particular, body 104 may be shaped to resemble a selected article for which it is desirable to convey some information or message to users of lamp 100, or to others that might view lamp 100. For example, body 104 may be shaped to resemble a consumer product to convey notice of that consumer product to consumers, and thereby promote it. For example, as depicted in FIGS. 1A and 1B, body 104 may be shaped like a wine bottle. Other example shapes are depicted in FIGS. 3, 4, 5 and 6 further discussed below.

Body 104 may be formed into a given shape (e.g., resembling a selected article) using conventional sculpting processes. As will be appreciated, suitable sculpting processes may depend on the material of body 104. For example, body 104 may be shaped by cutting, carving, or drilling, or the like, e.g., when body 104 is made of rock or wood. Body 104 may also be shaped using a casting process and an appropriate mold, e.g., when body 104 is made of ceramic, plastic, or metal. For example, when body 104 is made of metal, body 104 may also be shaped using a combination of bending, pressing, stamping, or forging processes. When body 104 is made of ceramic, body 104 may be formed by sintering.

Body 104 may be colored to match the color(s) of the selected article. For example, the material of body 104 may be chosen to match the colors of the selected article. Further, coloring agents may be introduced during the manufacturing process of body 104 to set its color.

Figure 2A:
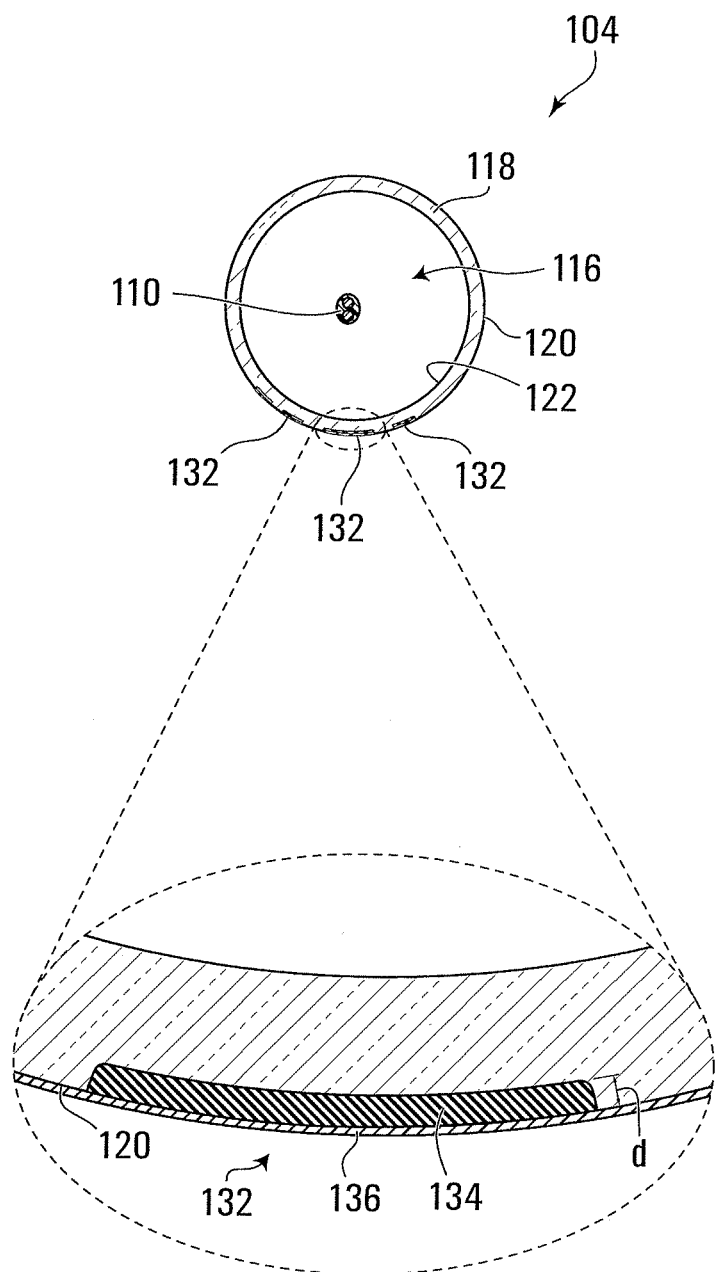
FIG. 2A is a cross-sectional view of the lamp of FIG. 1A, taken along line 2-2.

Body 104 may have an outer wall 118 defining and substantially enclosing a hollow interior 116 (FIG. 2A). The thickness of outer wall 118 is selected to be sufficient to allow recesses of sufficient depth to be provided thereon or cavities of sufficient depth to be provided therein, as detailed below. At the same time, the thickness of outer wall 118 is selected to define hollow interior 116 of sufficient size to allow a cord 110 to pass therethrough, for connecting socket 106 to a power supply through switch 112. In some embodiments, the thickness of outer wall 118 may be selected to define hollow interior 116 of sufficient size to house other objects, which are detailed below. Outer wall 118 may provide an outer surface 120 that is substantially smooth. In some embodiments, outer surface 120 may be glossy. As will be appreciated, when body 104 is made of a transparent or translucent material, the contents in interior 116 may be visible through outer wall 118.

In the depicted embodiment, outer surface 120 includes recesses 132 shaped to form indicia 130. As noted, body 104 may be shaped to resemble a selected article. Correspondingly, recesses 132 may be shaped such that indicia 130 indicates an entity associated with the selected article. In this way, the shape of body 104 conveys notice of the selected article, while indicia 130 conveys notice of an entity associated with the selected article. Further, the shape of body 104 and indicia 130 cooperate to convey notice of the association between the entity and the selected article, which may establish or reinforce that association in the minds of individuals who view lamp 100.

In some embodiments, the selected article may be a consumer product, and indicia 130 may indicate a business associated with that consumer product, e.g., a manufacturer, retailer, or distributor of that consumer product. Thus, the entity indicated by indicia 130 may be a trade-mark, tradename, or brand-name used by that business. In such embodiments, body 104 and indicia 130 cooperate to convey notice of the association between the consumer product and the business. Thus, lamp 100 may be used by a business as a medium for disseminating a commercial message, e.g., to advertise the business entity's product or otherwise encourage consumers to purchase that product, as further detailed below. For example, in the depicted embodiment, body 104 is shaped to resemble a wine bottle, while indicia 130 indicates "ABC", which may be a brand-name used by a business associated with that bottle of wine, e.g., a manufacturer, retailer, or distributor of that bottle of wine. Lamp 100 may be thus be used by that business to promote its wine product.

As depicted, indicia 130 includes only text. However, in other embodiments, recesses 132 may form indicia including any one or a combination of text, symbols, logos, designs, graphics, or the like. As will be appreciated, the number of recesses 132 may vary depending on the indicia to be formed. For example, in some embodiments, indicia may be formed using only a single recess 132.

Recesses 132 may be formed using a variety of conventional processes. Recesses 132 may be formed by engraving surface 120 using a tool. For example, surface 120 may be engraved manually, or automatically using a computer-controlled tool such as a computer numerical control (CNC) system. Recesses 132 may also be formed using corresponding protrusions on a mold used to form body 104, e.g., when body 104 is formed using a casting process. Recesses 132 may also be formed using a physical or chemical etching process, e.g., by selectively exposing portions of surface 132 corresponding to the shape of indicia 130 to etchants. Recesses 132 may also be formed by pressing surface 120. As will be appreciated, suitable processes for forming the recesses 132 may depend on the size, shape, and material of body 104.

In the depicted embodiment, indicia 130 is formed by recesses 132 on outer surface 120 of outer wall 118. However, when outer wall 118 is made of a transparent or translucent material, indicia 130 may also be formed, alternatively or additionally, by recesses on an inner surface 122 (FIG. 2A) of outer wall 118. Indicia may also formed on objects placed inside hollow interior 116.

Further, when outer wall 118 is made of a transparent or translucent material, indicia 130 may be outlined by substantially enclosed cavities in body 104 instead of recesses on a surface of body 104. For example, in an embodiment depicted in FIG. 2C, recesses 132 may be replaced by cavities 132" in body 104, e.g., in outer wall 118, and cavities 132" are shaped to form indicia 130. Cavities 132" may be formed in outer wall 118 using conventional processes, e.g., by cutting, carving, or drilling into outer wall 118. Cavities 132" may also be formed in outer wall 118 using a casting process and an appropriate mold.

As detailed below, recesses 132 or cavities 132" defining indicia 130 are filled with the photoluminescent material. Thus, indicia 130 may be seen even in the dark, and notice of the entity indicated by indicia 130 continues to be conveyed for a period of time even after lamp 100 is turned off and the environment is dark.

To allow the photoluminescent material in recesses 132 or cavities 132" to absorb light from light bulb 108, recesses 132 and cavities 132" are positioned on body 104 to receive light from light bulb 108. Such light may be received directly from light bulb 108, or indirectly by reflection. Directly receiving light from light bulb 108 may allow indicia 130 to glow longer and more brightly in the dark.

Further, in embodiments of lamp 100 to be used as a medium for disseminating a message or information, such as for a promotional purpose, recesses 132 and cavities 132" may be positioned on body 104 in a prominently visible location, e.g., centrally on body 104, to attract viewer attention. Similarly, recesses 132 or cavities 132" may be sized to form indicia 130 of a prominently visible size such that indicia 140 may be seen even from a distance. Forming indicia 130 to be prominently visible may allow indicia 130 to convey information more effectively. In some embodiments, indicia 130 may be placed and sized to resemble actual indicia borne on the selected article that body 104 is shaped to resemble. Placing and sizing indicia 130 to resemble actual indicia on the selected article may enhance the resemblance between body 104 and the selected article.

In some embodiments, the bottom end of body 104 may be adapted to provide a stable support for lamp 100 such that base 103 may be omitted from support 102. In such embodiments, switch 112 may be moved to another location on lamp 100, e.g., on body 104, or on socket 106, or provided on a power cord connected to socket 106. In other embodiments, base 103 and body 104 may be formed as a unitary piece. For example, base 103 and body 104 may be formed from a single piece of rock, or using a single mold during a casting process.

Socket 106 is provided on the top end of body 104 and is adapted to receive light bulb 108 and to selectively provide power thereto. Socket 106 may be mounted to the top end of body 104, using conventional mounting techniques. For example, the bottom end of socket 106 may include a lip extending downwardly around its perimeter to define a cavity sized to receive and retain the top end of body 104. Alternatively, socket 106 may simply be placed on top of body 104 and securely fastened thereto. Socket 106 may be securely fastened to body 104 using conventional fasteners, such as, e.g., adhesives, screws, bolts, ties, or the like. Socket 106 may be made of ceramic, plastic, metal, or another suitable material. Socket 106 includes metal connectors for electrical connection with light bulb 108. In some embodiments, lamp 100 may include additional sockets for receiving additional light bulbs.

As depicted, light bulb 108 is a conventional incandescent bulb. In other embodiments, light bulb 108 may be a halogen bulb, a fluorescent bulb, a compact fluorescent bulb, a high-intensity discharge (HID) bulb, a light-emitting diode (LED), or the like. In some embodiments, light bulb 108 may be replaced with an array of light bulbs in one or more sockets, connected in a variety of series and/or parallel arrangements.

Light bulb 108 may include a conventional Edison screw base for engaging complementary screw threads on the interior surface of socket 106. In other embodiments, light bulb 108 may be coupled to socket 106 using another type of connection such as a bayonet connection or bi-pin connection. Other types of connections may also be used.

When light bulb 108 is received within socket 106, electrical terminals in the base of light bulb 108 are in electrical communication with corresponding terminals within socket 106. In turn, terminals of socket 106 may be electrically connected to mains power by way of a power cord 110. As depicted, power cord 110 extends through hollow interior 116 (FIG. 2A) of lamp body 104, and through base 103. Alternatively, power cord 110 may extend on the outside of body 104, e.g., when body 104 is not hollow. Power cord 110 is connected to switch 112, which allows the supply of power to be controlled, and thereby selectively turn light bulb 108 on or off. Power cord 110 is terminated outside of lamp 100 by a conventional plug for connection with mains power. In another embodiment, socket 106 may be connected to one or more batteries that allow light bulb 108 to be operated under battery power. Such batteries may be located or housed inside lamp 100 (e.g., within body 104 or base 103), or outside lamp 100.

Switch 112 is used to control the supply of power to light bulb 108. As depicted, switch 112 is mounted on base 103. In the depicted embodiment, switch 112 is a rocker switch, allowing light bulb 108 to be selectively toggled between on and off conditions. In other embodiments, switch 112 may be another type of switch such as, e.g., a pole switch, a rotary switch, a dimmer switch, a push-button switch, or a solid state switch. The switch may further include, for example, a control circuit for enabling the switch to function as a multi-stage switch, such that multiple light bulbs may be independently controlled by the same switch.

As depicted in FIG. 1B, lamp 100 may include a removable lampshade 114 that diffuses light passing through it, such as light emitted by light bulb 108. As depicted, lampshade 114 is substantially frustoconical in shape. However, in other embodiments, lampshade 114 may have a different shape; for example, lampshade 114 may be shaped as a cylinder, a prism, a pyramid, or the like. In the depicted embodiment, lampshade 114 is made of fabric. However, in other embodiments, lampshade 114 may be made from other materials such as, e.g., paper, glass, ceramic, or the like. Lampshade 114 includes a support frame that is mountable to the socket 106. Lampshade 114 may be securely fastened to socket 106 using conventional fasteners.

The photoluminescent indicia 130 provided on body 104 of lamp 100 is further described with reference to FIG. 2A, which is a cross-sectional view of body 104 along line 2-2 of FIG. 1A. Each recess 132 may extend into body 104 to a depth d (FIG. 2A) of approximately 2 mm. In some embodiments, this depth may vary between approximately 0.5 mm to approximately 10 mm.

As will be appreciated, providing recesses 132 filled with the photoluminescent material allows the photoluminescent material to be applied to body 104 in a thicker layer, as compared to applying the photoluminescent material simply as a surface coating on body 104 (e.g., when the photoluminescent material is printed on body 104). This in turn allows photoluminescent indicia 130 to emit light more brightly and to be visible for a longer duration in the dark. Further, providing recesses 132 and controlling their depths allows the amount of photoluminescent material that may be contained in recess 132 to be controlled. This allows the brightness and duration of afterglow to be controlled. As a larger amount of the photoluminescent material may be used to obtain the desired brightness and duration, a wider selection of photoluminescent materials may be used. In comparison, for a thin surface coating to be sufficiently bright, suitable photoluminescent materials are more limited, as materials that exhibit weaker photoluminescent emission intensity may not be useful.

As depicted, each recess 132 is filled with a photoluminescent material to form photoluminescent layer 134. The photoluminescent material in photoluminescent layer 134 may be a phosphorescent material, and may include a fluorescent material. Conveniently, unlike fluorescence, phosphorescence can occur slowly, and some phosphorescent materials may continue to emit light over a relatively long period of time after absorption of the excitation light. For example, a phosphorescent material may continue to emit light hours after absorption of the excitation light. On the other hand, a fluorescent material may conveniently emit more intense light when excited than a phosphorescent material. A photoluminescent material may absorb incident light having a first wavelength and emit light at a second wavelength different from the first wavelength.

Depending on the particular application, suitable phosphorescent materials may include sulfides such as zinc sulfide or calcium sulfide, alkaline earth aluminates (e.g., alkaline earth aluminate oxides such as strontium aluminum oxides, calcium aluminum oxides, or barium aluminum oxides), alkaline earth silicates, rare earth metals or rare earth oxides, and combinations thereof. As is known, the phosphorescent material may include impurities or a dopant as an activator. An activator that may be included in the phosphorescent material can be used to adjust the color (i.e., wavelength) of the light emitted and the emission duration. For example, the phosphorescent material may be formed by combining zinc sulfide with a copper activator. Other metal activators that may be used in different embodiments include aluminum, cobalt, silver, gold, manganese, gallium, indium, scandium, lead, cerium, terbium, europium, gadolinium, samarium, praseodymium, and other rare earth elements. Halogens may also be used as activators. Other suitable phosphorescent or afterglow materials known to those of ordinary skill in the art may also be used.

In some embodiments, the photoluminescent material in photoluminescent layer 134 may be formed by mixing a suitable photoluminescent powder with a suitable liquid including a binder that binds the powder together as well as to a surface (e.g., a surface of recess 132) when cured. Suitable powder and binder materials may be obtained from commercial sources. For example, in one specific embodiment, the powder is phosphorescent powder TD-4A, provided by Shiyatu Chemical Industry (Shenzen, China), and the liquid is obtained by mixing a clear varnish and a diluent, both provided by Foshan Yingcai Paint Products Co., Ltd. (Foshan, China). In this specific embodiment, the varnish and diluent are mixed in a 1:1.5 ratio. Bright and long lasting phosphorescent materials may also be formed from Europium Ultra-Glow™ powders, provided by United Nuclear Scientific LLC (East Lansing, Mich., USA).

Figure 2B:
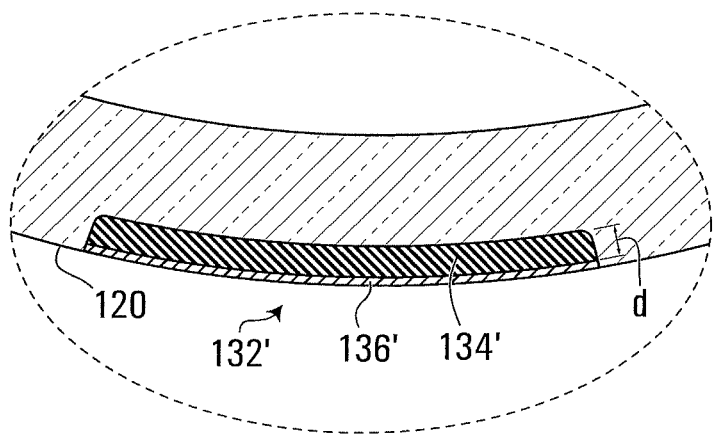
FIG. 2B is a partial cross-sectional view of a lamp body, exemplary of another embodiment.

During manufacture of lamp 100, photoluminescent layer 134 in each recess 132 may be formed using a conventional technique. For example, the photoluminescent material may be deposited in each recess 132 in the form of a liquid, gel, or resin, and allowed to dry and harden therein to form photoluminescent layer 134. In the depicted embodiment, photoluminescent layer 134 is formed to substantially fill a recess 132, so that its top surface is substantially flush with outer surface 120 of body 104 (FIG. 2A). In other embodiments, as depicted in FIG. 2B, a recess 132 may be replaced with a recess 132' that is only partially filled with the photoluminescent material to form a photoluminescent layer 134' that does not extend the full depth of recess 132'. In such embodiments, the remaining space in recess 132 may be filled with a protective material to cover photoluminescent layer 134', as described below.

Optionally, before the photoluminescent material is applied to recesses 132, portions of the surfaces of recesses 132 that will contact photoluminescent layer 134 may be primed to improve adherence of photoluminescent layer 134 to the surfaces of recesses 132. For example, these portions may be primed by roughing the surface using a chemical or physical treatment, or by applying a primer coating. In some embodiments, photoluminescent layer 134 may include other materials such as a binder or adhesive to adhere photoluminescent layer 134 to recesses 132.

In some embodiments, photoluminescent layer 134 may be transparent or semi-transparent. For example, this may allow interior 116 of body 104 to be visible through photoluminescent layer 134. This may also allow the photoluminescent layer 134 (and indicia 130) to remain relatively invisible when it is not emitting visible light.

Figure 2C:
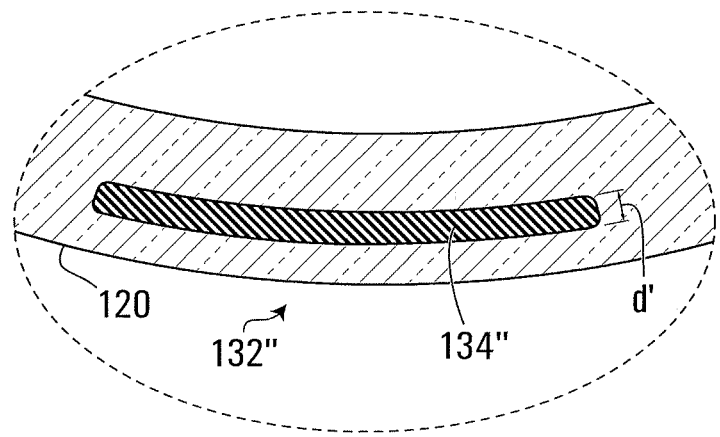
FIG. 2C is a partial cross-sectional view of a lamp body, exemplary of a further embodiment.

As noted, in some embodiments, recesses 132 may be replaced by cavities 132" (FIG. 2C). As show in FIG. 2C, in such embodiments, a photoluminescent layer 134" is formed within a cavity 132". Photoluminescent layer 134" may be formed by filling a cavity 132" with a photoluminescent material. For example, a photoluminescent material in the form of a liquid, gel, resin, or powder may be introduced (e.g., injected or poured) into a cavity 132" by apertures (not shown), each connecting a cavity 132" with the exterior of body 104. In some embodiments, e.g., when the photoluminescent material is a resin, the photoluminescent material may be cured in cavity 132", and once hardened, be retained within cavity 132". In such embodiments, the apertures connected to cavities 132" may be left unsealed. In other embodiments, the apertures may be sealed after cavities 132" are filled with the photoluminescent material, e.g., by applying a coating to the surface of body 104 such as a protective coating as described below.

Cavities 132" may be formed to have a depth d' (FIG. 2C) similar to depth d of recesses 132. As such, depth d' may be approximately 2 mm, and may vary between approximately 0.5 mm to approximately 10 mm. Like recesses 132, cavities 132" allow the photoluminescent material to be provided in a thicker layer than when the photoluminescent material is simply applied as a coating on body 104. Further, controlling the depth d' of cavities 132" allows the amount of the photoluminescent material in cavities 132", and correspondingly the brightness and duration of afterglow to be controlled.

Conveniently, providing the photoluminescent material in a recesses or a cavity reduces or prevents the incidence of physical contact with that photoluminescent material, e.g., when lamp 100 is cleaned or handled, and thereby protects the photoluminescent material from damage or unintentional removal caused by such contact.

Optionally, when the photoluminescent material is contained in recesses on the surface of body 104, the photoluminescent material may be further protected by applying a clear protective coating over it. For example, as depicted in FIG. 2A, protective material may be applied to body 104 to form a protective coating 136. Protective coating 136 acts as a barrier protecting photoluminescent layer 134 from damage or unintentional removal due to physical contact. In some embodiments, protective coating 136 may also protect photoluminescent layer 134 from damage caused by exposure to one or more of air, moisture, and light (e.g., ultra-violet light). The protective material forming protective coating 136 may, for example, be a varnish, enamel paint, or a clear coat material typically used in the automotive industry. The protective material may contain polyurethanes, urethanes, acrylics, or the like.

Suitable protective coating materials may be obtained from commercial sources. For example, in one specific embodiment, the protective material may be a UV-curable varnish that adheres to rock material, provided by Chengdu Fibbow Composite Materials Technology Co., Ltd. (Chengdu, China). Upon being applied to outer surface 120, this varnish may be cured at room temperature by UV light to form a protective coating having a pencil hardness rating of at least 3H.

In some embodiments, protective coating 136 may be formed to substantially cover outer surface 120 of body 104, and in this way also protect outer surface 120. Conveniently, protective coating 136 may provide outer surface 120 with a glossy finish. In other embodiments, protective coating 136 may be formed to cover only part of outer surface 120, e.g., only a region or regions containing recesses 132. For example, it may be desirable to cover only those regions containing recesses 132 with protective coating 136 to retain the natural finish of outer surface 120 in other regions.

In yet other embodiments, as depicted in FIG. 2B, a protective material may be applied within recesses containing photoluminescent material. For example, a protective material may be applied in each recess 132 to form a protective coating 136' over each photoluminescent layer 134'. As depicted, protective coating 136' may be formed to be substantially flush with outer surface 120. Protective coating 136' may have a similar finish as outer surface 120 (e.g., smooth and/or glossy), such that protective layer 134' is not visually distinctive relative to outer surface 120.

In some embodiments, protective coating 136 or protective coating 136' may be a multi-layer coating. For example, a multi-layer coating may include a primer or a base coat, and a top coat.

During operation of lamp 100, power cord 110 can be plugged into mains power to provide an electrical connection to light bulb 108. Light bulb 108 can be turned on by operating switch 112, causing light bulb 108 to emit light. Photoluminescent indicia 130 absorbs light emitted from light bulb 108, and may also absorb light from other sources (e.g., room lights or ambient light). In response to absorbing light, the photoluminescent material emits light, causing indicia 130 to glow even long after light bulb 108 has been turned off. For example, when the photoluminescent material is a suitable phosphorescent material, indicia 130 may continue to glow for hours after light bulb 108 has been turned off. Light emitted by photoluminescent indicia 130 may not be apparent to users when light bulb 108 is turned on or the environment is bright. However, when light bulb 108 is turned off and the environment is dark, light emitted by photoluminescent indicia 130 will be readily apparent.

Thus, indicia 130 may be seen for an extended period of time after light bulb 108 has been turned off and the environment is dark. In some embodiments, e.g., when the photoluminescent material is transparent, indicia 130 may become noticeable for a period of time only after light bulb 108 has been turned off and the environment is dark.

FIGS. 3, 4, 5 and 6 depict alternate embodiments of the body of lamp 100.

Figure 3:
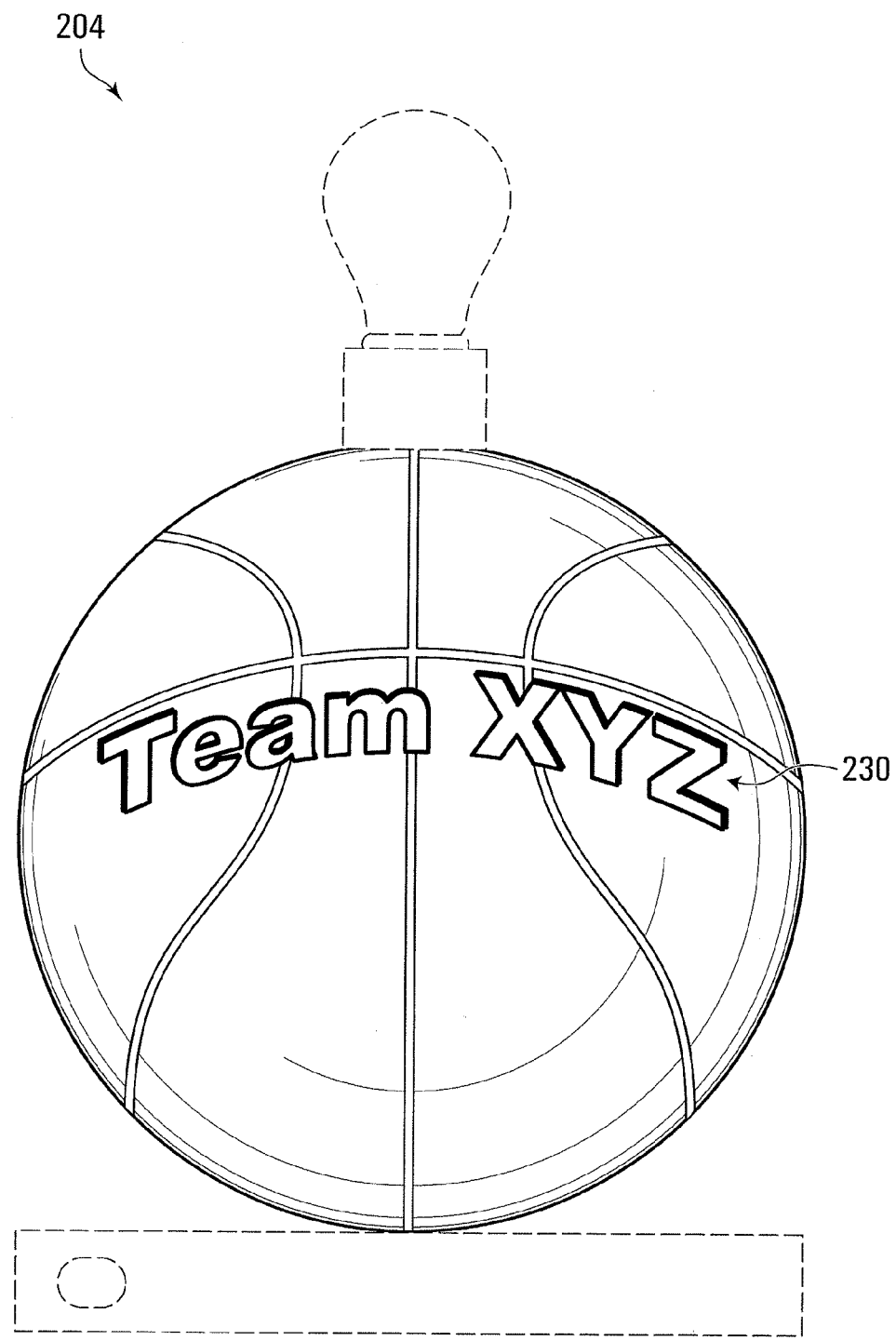
FIG. 3 is a side elevation view of a lamp body, exemplary of another embodiment.

In particular, FIG. 3 depicts a body 204 shaped to resemble a basketball. As depicted, the outer surface of body 204 includes recesses defining indicia 230, namely, "Team XYZ", i.e., indicating the name of a basketball team. Thus, a lamp 100 having body 204 conveys information regarding an association between Team XYZ and basketball, and may be used to promote Team XYZ, such as prompting individuals to watch basketball games played by Team XYZ. The information conveyed by lamp 100 having body 204 may make such a lamp desirable to some consumers (e.g., fans of Team XYZ) for its value as a collectible object or memorabilia.

Figure 4:
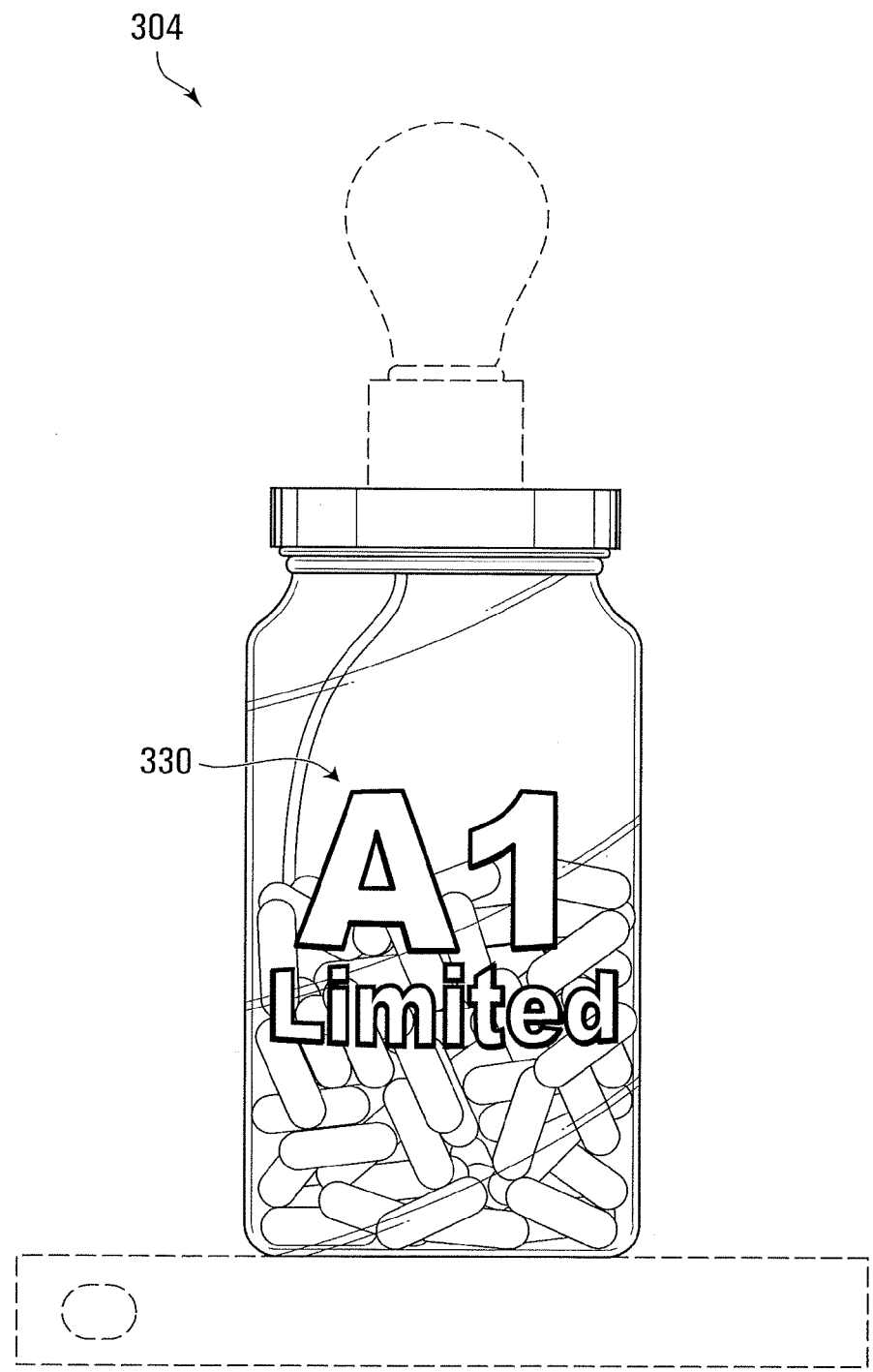
FIG. 4 is a side elevation view of a lamp body, exemplary of a further embodiment.

FIG. 4 depicts a body 304 shaped to resemble a bottle of pills. As depicted, the outer surface of body 304 includes recesses defining indicia 330, namely, "A1 Limited", i.e., indicating a manufacturer of the pills. Thus, a lamp 100 having body 304 may be used to promote pills made by A1 Limited. As depicted, body 304 includes a translucent outer wall allowing the interior of body 304 to be visible through the outer wall. As depicted, objects resembling pills may be placed within the interior of body 304 to be visible through the outer wall. Such objects may be formed from materials similar to the materials used to form body 304, as discussed above, or other suitable materials.

Figure 5:
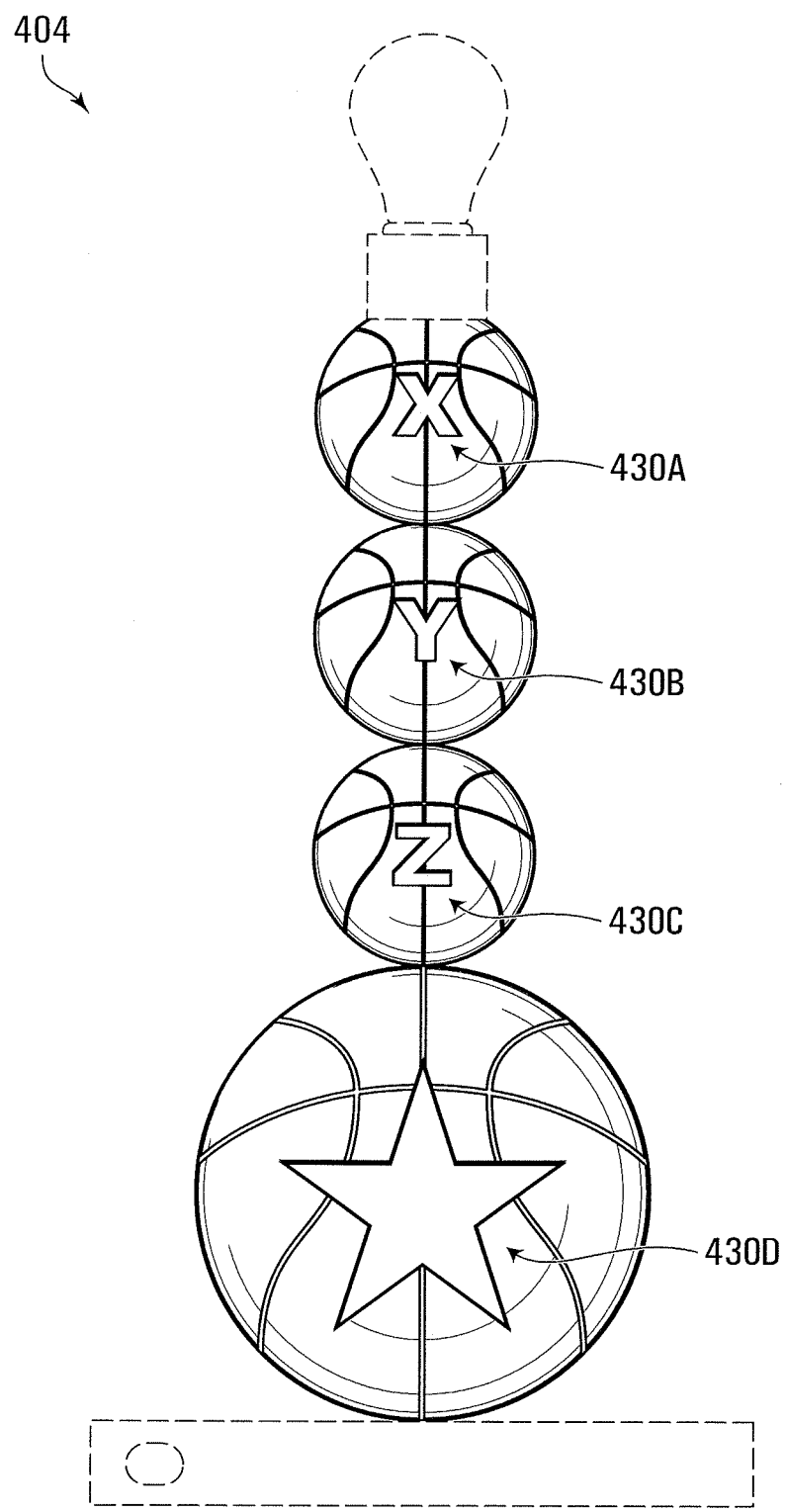
FIG. 5 is a side elevation view of a lamp body, exemplary of yet another embodiment.

FIG. 5 depicts a body 404 shaped to resemble four basketballs. In particular, body 404 is shaped to resemble four basketballs stacked vertically, with the bottom-most basketball being larger than the other three basketballs, which are of substantially the same size. The outer surface of body 404 includes recesses defining indicia 430A, 430B, 430C, and 430D that may indicate the name of an entity associated with basketballs (e.g., a basketball team), or a logo of such an entity (e.g., a logo shaped like a star, as indicated by indicia 430D). Thus, like a lamp having body 204, a lamp having body 404 may be used to promote a basketball team.

Figure 6:
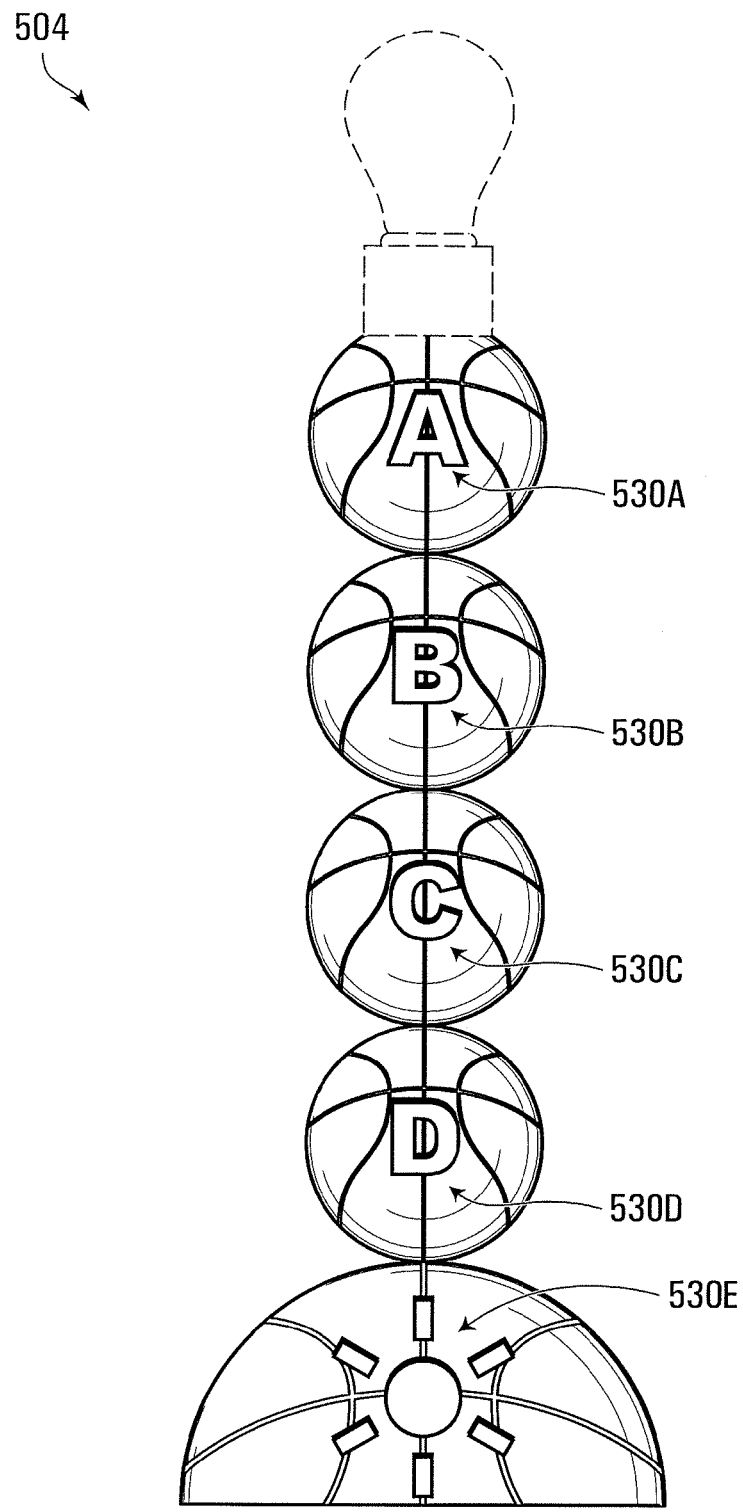
FIG. 6 is a side elevation view of a lamp body, exemplary of a yet further embodiment.

FIG. 6 depicts a body 504 shaped to resemble four basketballs stacked vertically on a half-basketball. As depicted, the half-basketball is larger than the other four basketballs, which are of substantially the same size. Body 504 has a substantially flat bottom surface (i.e., the bottom surface of the half-basketball) that allows body 504 to support lamp components on a substantially flat surface. As such, a lamp 100 having a body 504 need not include a separate base. The outer surface of body 504 includes recesses defining indicia 530A, 530B, 530C, 530D, and 530E that may indicate the name of an entity associated with basketballs (e.g., a basketball team), or a logo of such an entity (e.g., a logo shaped like a sun, as indicated by indicia 530E). Like a lamp having body 204 or 404, a lamp having body 504 may also be used to promote a basketball team.

As will be appreciated, the height of body 404 or 504 may be adjusted by changing the shape of body 404 or 504 to resemble a fewer or greater number of basketballs.

The recesses on body 204, 304, 404, or 504 may be filled with a photoluminescent material, as for body 104.

As now can be appreciated, the body material for the lamps may be selected based a number of factors. For example, the body material may need to be sufficiently strong to support the lamp components to be supported and mounted thereon. Further, the body material may be selected based on workability for ease of production. In particular, the body material should be suitable for forming recesses and cavities as described herein, and be compatible with the photoluminescent material and the manufacturing processes to be used for forming the recesses and cavities and any coatings on the support body. The body material may also be selected to suit the target group's tastes. For example, while marble can be readily shaped into a desired shape and to form a recess for holding a photoluminescent material, marble is also considered to be a desirable luxury material for some consumers.

The photoluminescent material filled in recesses or cavities on the support body may also be selected based on a number of factors. For example, the photoluminescent material may be selected based on the rate at which the material emits light after absorbing excitation light. As noted, it may be desirable in embodiments to select a photoluminescent material that is phosphorescent and has a relatively slow emission rate and thus a relatively long emission lifetime when excited (long-lasting afterglow). In some embodiments, this lifetime may be up to several minutes or several hours, and may, for example, be over ten minutes. In other embodiments, this lifetime may be even longer, e.g., over ten hours. The photoluminescent material may also be selected based on the intensity of the light emitted. As noted, the intensity of the light emitted and the duration the light is visible in the dark may also depend on the quantity of the photoluminescent material used, which may be controlled by controlling the depth of recesses or cavities provided on the support bodies for containing the photoluminescent material. The photoluminescent material may also be selected based on the wavelengths of the light required for excitation. In particular, the required excitation wavelengths should include wavelengths emitted by the light bulb of the lamp. The photoluminescent material may also be selected based on the wavelengths of the light emitted after excitation. In particular, the emitted wavelengths should include visible light. Further, the emitted wavelengths may be controlled such that the color of the emitted light is a desired color. The photoluminescent material may also be selected for its compatibility with the body material, any binders or adhesives that may be required to adhere the photoluminescent material to the body material, any protective coating applied over the photoluminescent material, and its suitability for forming into a liquid, gel or resin, as may be necessary to apply the photoluminescent material to lamp support bodies during the manufacturing of the lamps.

The material of the protective coating applied over the photoluminescent material may also be selected based on a number of factors. For example, the protective coating may be selected based on its hardness and ability to protect the photoluminescent material from damage or unintentional removal due to physical contact. In an embodiment, the protective coating may have a hardness rating greater than 3H. The protective coating may also be selected based on its suitability to protect the photoluminescent material from damage caused by exposure to one or more of air, moisture, and light (e.g., ultra-violet light). The protective material may also be selected based on other factors, such as the thickness of the protective coating provided, the durability of the coating, the transparency of the coating, and the smoothness or glossiness of the finish provided by the coating, and its compatibility with the body material and the photoluminescent material.

As noted, lamp support bodies may serve a function in addition to supporting other lamp components and being decorative. For example, as disclosed herein, lamp support bodies may also be used to convey a message or information. As such, lamps having suitable support bodies may be used to disseminate a particular message or particular information, when formed and distributed to be viewed by targeted recipients of that message or information. For example, lamps having suitable support bodies may be used to disseminate a message regarding a selected article, an entity associated with that article, or an association between the entity and the selected article. Thus, the lamps may be used to promote the article, the entity, and/or the association therebetween. For example, then the selected article is a particular product and the associated entity is a business marketing that product, lamps having suitable support bodies may be used to promote the business, the product, or the association between the business and the product.

First, a suitable article is identified or selected. For example, when the lamps are used to disseminate a message promoting a particular product having a defined shape, a suitable article may simply be selected to be that product. Lamps may also be used to promote a particular intangible product without a defined shape, such as a movie or a video game. In this case, a suitable article may be selected to be an article that represents or is uniquely associated with the intangible product, e.g., the selected article may be a recognizable object from the movie or video game. Lamps may also be used to promote a particular intangible product that is a service, a performance, or sporting event. For example, a suitable article may be selected to be a tooth to represent a dentistry service, or a musical note to represent a concert, or a baseball bat to represent a baseball game. Lamps may also be used to promote non-commercial events, such as a wedding, a bar mitzvah, or the like. For example, a suitable article may be selected to be a wedding cake to represent a wedding. Lamps may also be used to disseminate a message promoting a particular organization such as a company, a political organization, a religious organization, an educational institution, or the like. For example, a suitable article may be selected as a cross to represent a Christian organization.

A suitable indicia may also be identified to indicate the entity associated with the selected article. The indicia may simply be the name of the entity. When the selected article is a product, the indicia may be a trade-name, trade-mark, or brand-name used by the entity in association with the selected article.

Next, a plurality of lamps 100 are formed or otherwise obtained. The support body of each of the plurality of lamps is shaped to resemble the selected article, and has an indicia indicating the entity associated with the selected article.

Once formed or obtained, the lamps are distributed to be viewed by members of a target group, namely, intended recipients of the message or information to be disseminated. For example, the target group may be potential customers of a product, potential attendees or participants of an event, or the public at large. The lamps may be distributed to members of the target group. The lamps may also be distributed to establishments or locations where members of the target group are expected to visit. For example, the lamps may be distributed to business establishments, such as stores, malls, restaurants, bars, theatres, or the like. The lamps may also be distributed to other types of establishments and locations such as workplaces, schools, townhalls, or the like. The lamps may also be distributed through various channels of trade, such as stores, websites or the like. When used for a promotional purpose, the lamps may be distributed as promotional materials free-of-cost, or for a nominal cost, e.g., to cover the cost of manufacturing the lamp.

Once distributed, the lamps may function to convey a message or information to individuals who look at the lamps. For example, the lamps may function to promote to those individuals the selected article, a product or event represented by the article, an entity associated with the article, or an association between the entity and the article.

Lamps having support bodies suitable for conveying a message or information may also be used for purposes other than promotion. For example, the lamps may have support bodies that convey a message or information that appeals to certain individuals, such that the lamps may be desirable to those individuals. Lamps may, for example, have support bodies shaped to convey notice of a selected article held in high regard by certain individuals, e.g., an object from a favorite movie or video game. Such lamps may be used as memorabilia. Lamps may also, for example, have support bodies with indicia that conveys notice of an entity held in high regard by certain individuals, e.g., a favorite sports team, a school attended by those individuals, an affiliated religious organization, or an affiliated political party. Lamps may also have support bodies that convey a message or information that entertains certain individuals. For example, the support bodies may have an amusing shape. Similarly, the support bodies may include indicia that conveys a joke or other entertaining message. Such lamps may be sold for profit.

In some embodiments, the entire support body of lamp 100 shaped to resemble a selected article. In other embodiments, a portion of the support body of lamp 100 is shaped to resemble a selected article, and that portion includes a photoluminescent indicia.

Lamp 100 is shown as a table lamp, and is portable and suitable for placing on a flat surface (e.g., a table top). However, in other embodiments, the lamp may be another type, e.g., a floor lamp, a wall-mountable or ceiling-mountable lamp. In yet other embodiments, the lamp may be adapted for exterior use, e.g., including suitable weather protection. For example, in such embodiments, the lamp may be a garden lamp.

In selected embodiments, a lamp may have a body that primarily serves a decorative function in addition to supporting lamp components. In such embodiments, it is not necessary that the support body is shaped to resemble an article to be promoted. For example, the support body may have a common shape for conventional lamp supports (e.g., a sphere, a cone, or a cylinder) or having a decorative shape or a shape for an artistic expression. However, the support body has one or more recesses or cavities filled with a photoluminescent material to form a decorative indicia or artistic expression.

In another embodiment, lamps are used in a method of promotion. The method may be used to promote a particular entity, which may be an entity as discussed above. The method may also be used to promote a product or event that is provided by or is otherwise associated with the particular entity. According to this method, an article is identified for promoting the particular entity or its associated product or event. The article may be identified according to a manner discussed above.

Next, a plurality of lamps are formed or obtained. Each of the lamps has a support body shaped to resemble the identified article. Optionally, the support body may include an indicia, identified according to a manner discussed above. The shape of the support body and the indicia included thereon may, each alone, or in combination, cause the identified article to be recognizable by individuals viewing the lamps.

The lamps may be substantially similar to a lamp 100 described herein. However, the lamps may be another type of lamp with different support bodies. For example, the lamps may have support bodies with an indicia indicating the particular entity provided thereon using a conventional process. For example, the indicia may be painted, printed, carved, or etched on the support bodies, or be applied thereto as a label, sticker or decal. Further, the indicia need not be formed using an afterglow material.

Once the lamps are formed or obtained, they are distributed for viewing by members of a target group to promote the particular entity or to promote its associated product or event to those members. The target group may be a target group as discussed above. The lamps may be distributed according to a manner discussed above.

As used herein, the term "light bulb" is used to broadly refer to any powered light source for use on a lamp. A light bulb may be an incandescent bulb, fluorescent bulb, high-intensity discharge (HID) bulb, a light emitting diode (LED), or the like. The light bulb may also include other light sources suitable for use on a lamp.

As can be appreciated from the description herein, the term "entity" is also used broadly, and can be used to refer to any tangible or intangible object, or any party that can be uniquely identified.

The term "article" is used broadly to refer to any tangible or intangible object or image, or any combination of such objects or images. The term "product" is used broadly to refer to any tangible or intangible product which may include a service (service product) provided by an entity.

It will be understood that the word "a" or "an" is intended to mean "one or more" or "at least one", and any singular form is intended to include plurals herein.

It will further be understood that the term "comprise", including any variation thereof, is intended to be open-ended and means "include, but not limited to," unless otherwise specifically indicated to the contrary.

When a list of items is given herein with an "or" before the last item, any one of the listed items or any suitable combination of two or more of the listed items may be selected and used.

Of course, the above described embodiments are intended to be illustrative only and in no way limiting. The described embodiments are susceptible to many modifications of form, arrangement of parts, details and order of operation. The invention, rather, is intended to encompass all such modification within its scope, as defined by the claims.

What is claimed is:

1. A lamp comprising:
   a support comprising a body portion shaped to resemble a selected article, said body portion comprising rock and having a cavity shaped to form an indicia indicating an entity associated with the selected article; and
   a socket on said support for receiving a light bulb and selectively providing power thereto;
   wherein said cavity is positioned to receive light from said light bulb, and is filled with a photoluminescent material.

2. The lamp of claim 1, wherein said photoluminescent material is phosphorescent.

3. The lamp of claim 1, wherein said photoluminescent material comprises a zinc sulfide, a calcium sulfide, an alkaline earth aluminate, an alkaline earth silicate, or a rare earth metal.

4. The lamp of claim 1, wherein said photoluminescent material has an emission lifetime of at least 10 minutes.

5. The lamp of claim 1, wherein the article is a product associated with the entity.

6. The lamp of claim 1, wherein the entity is a trade-mark or a trade-name associated with the article, or a business that markets the article.

7. The lamp of claim 1, wherein said cavity has a depth between 0.5 mm and 10 mm.

8. The lamp of claim 1, wherein said rock comprises marble, limestone, or granite.

9. The lamp of claim 1, wherein said body portion comprises a protective coating covering at least said photoluminescent material.

10. The lamp of claim 9, wherein said protective coating comprises a varnish, an enamel paint, or a clear coat material.

11. The lamp of claim 1, wherein said lamp is a table lamp.

12. A method comprising:
identifying an article for conveying a message, for promoting the article, or for promoting an entity associated with the article;
obtaining or forming lamps, each being the lamp of claim 1, wherein the body portion of the lamp is shaped to resemble the article, and said indicia on said body portion indicates the entity associated with the article.

13. The method of claim 12, further comprising:
distributing said lamps for viewing by members of a target group to convey said message to said members, or to promote the selected article to said members, or to promote the entity associated with the article to said members.

14. The method of claim 13, wherein said members are potential customers of the entity associated with the article.

15. The method of claim 13, wherein said distributing comprises distributing said lamps at a businesses establishment visited by said members.

16. The method of claim 13, wherein said distributing comprises distributing said lamps to said members.

17. A lamp comprising:
a support comprising a body portion, said body portion comprising rock and having a cavity shaped to form an indicia; and
a socket on said support for receiving a light bulb and selectively providing power thereto;
wherein said cavity is positioned to receive light from said light bulb and is filled with a photoluminescent material.

18. The lamp of claim 17, wherein said photoluminescent material is phosphorescent.

19. The lamp of claim 17, wherein said body portion comprises a protective coating covering at least said photoluminescent material.

20. The lamp of claim 17, wherein said rock comprises marble, granite, or limestone.

* * * * *